(12) United States Patent
Shinohara et al.

(10) Patent No.: US 7,631,969 B2
(45) Date of Patent: Dec. 15, 2009

(54) COMBINED SPECTACLE LENS, AUXILIARY LENS, AND METHOD OF EDGING LENSES

(75) Inventors: Toshihide Shinohara, Chino (JP); Tadashi Kaga, Minowa-machi (JP)

(73) Assignee: Seiko Epson Corporation (HQ), Tokyo (JP)

( * ) Notice: Subject to any disclaimer, the term of this patent is extended or adjusted under 35 U.S.C. 154(b) by 176 days.

(21) Appl. No.: 11/344,137

(22) Filed: Feb. 1, 2006

(65) Prior Publication Data
US 2006/0176445 A1 Aug. 10, 2006

(30) Foreign Application Priority Data

| Feb. 4, 2005 | (JP) | ............................. 2005-028578 |
| Mar. 18, 2005 | (JP) | ............................. 2005-079342 |
| Mar. 22, 2005 | (JP) | ............................. 2005-081192 |
| Nov. 8, 2005 | (JP) | ............................. 2005-323171 |

(51) Int. Cl.
G02C 7/06 (2006.01)
G02C 7/08 (2006.01)

(52) U.S. Cl. ..................... 351/169; 351/172; 351/177

(58) Field of Classification Search ................ 351/169, 351/172, 168, 177
See application file for complete search history.

(56) References Cited

U.S. PATENT DOCUMENTS

| 3,877,798 | A | | 4/1975 | Tolar et al. |
| 4,441,795 | A | * | 4/1984 | Lobdell ....................... 351/169 |
| 4,576,623 | A | | 3/1986 | Mann |
| 4,955,712 | A | | 9/1990 | Barth et al. |
| 5,644,374 | A | | 7/1997 | Mukaiyama et al. |
| 5,771,089 | A | | 6/1998 | Barth |
| 5,861,934 | A | * | 1/1999 | Blum et al. .................. 351/169 |
| 6,027,214 | A | | 2/2000 | Graham |
| 6,079,827 | A | * | 6/2000 | Coleman et al. ............. 351/177 |
| 6,244,705 | B1 | * | 6/2001 | Ledbetter et al. .............. 351/57 |

FOREIGN PATENT DOCUMENTS

| EP | 0 356 204 A2 | 2/1990 |
| JP | 62-500403 A | 2/1987 |
| JP | 63-254415 A | 10/1988 |
| JP | 2519921 B2 | 5/1996 |
| JP | 3030336 U | 8/1996 |
| JP | 2002-311397 A | 10/2002 |
| JP | 2003-315751 A | 11/2003 |
| JP | 2004-226632 A | 8/2004 |
| JP | 2004-333588 A | 11/2004 |
| JP | 2005-31285 A | 2/2005 |

* cited by examiner

*Primary Examiner*—Scott J Sugarman
(74) *Attorney, Agent, or Firm*—Sughrue Mion, PLLC

(57) ABSTRACT

A combined spectacle lens including a combination of a basic lens and an auxiliary lens, the basic lens formed with a progressive-power surface having a first power portion having a power for viewing an object at a predetermined distance, a second power portion having a power different from that in the first power portion, and a progressive portion in which the power is progressively changed from the first power portion to the second power portion on either one or both of refractive surfaces on an object side and an eyeball side, wherein a resultant power obtained by combining a basic lens power of the basic lens and an auxiliary lens power of the auxiliary lens is partly or entirely different from that of the basic lens power.

12 Claims, 8 Drawing Sheets

COMBINED SPECTACLE LENS, AUXILIARY LENS, AND METHOD OF EDGING LENSES

BACKGROUND

1. Technical Field

The present invention relates mainly to a combined spectacle lens having a progressive power for a person having presbyopia eyes with low amplitude of accomodation and an auxiliary lens used for the combined spectacle lens, and a method of edging the lenses.

2. Related Art

A progressive-power lens is used mainly as a vision corrective lens for a person having presbyopia eyes with low amplitude of accomodation, and is a lens in which a power is changed continuously from a power required for viewing an object at a distance or an intermediate distance to a power required for viewing an object nearby on one piece of lens without no boundary so that it has a fashionable looking.

Optical performance of the progressive-power lens basically depend on a progressive corridor length which corresponds to a distance on a principal meridian of a progressive portion in which the power is continuously changed and an addition power which is a difference of the power of the progressive portion. As one of designs according to applications, for example, there is so-called a distance-near type, which is designed in such a manner that both of a distance visual field and a near visual field are arranged in well-balanced manner and the progressive corridor length is set to a value on the order of 10 to 16 mm so as to allow a user to rotate the eye easily when viewing an object nearby. There are also so-called an intermediate-near type which is intended mainly to be used for viewing an intermediate area of about 1 meter to an area nearby, and a near-near type which is intended specifically to be used for viewing an object nearby. The intermediate-near type and the near-near type are designed to have the long progressive corridor length on the order of 19 to 25 mm in order to realize a wide visual field in an intermediate view. In this manner, the optimal optical performance for different applications cannot be obtained in one design.

When going out, a comfortable visual field can be obtained by using the distance-near type which is intended mainly to be used for a distance view. During deskwork or when working in a room, a comfortable visual field can be obtained by using the intermediate-near type or the near-near type. In order to obtain a comfortable visual field both when going out and working in a room, it is necessary to prepare the distance-near type lenses and the intermediate-near type lenses in respective spectacle glass frames respectively.

However, in this circumstance, it is necessary to purchase lenses of different designs, and also to purchase the spectacle glass frames for each type of lenses, and hence the cost is increased. Therefore, it will be very convenient if the design type of the progressive-power lens can be changed easily by combining the spectacle lenses.

A technique to combine two spectacle lenses is publicly known and, as shown in JP-A-2003-315751 and Japanese Utility Model Registration No. 3030336, spectacle glasses of a front-hanging type, which are configured in such a manner that a sub-lens can be detachably attached to a front surface of a normal spectacle lens as a basic lens with a clip mechanism or the like, are known.

In Japanese Patent No. 2519921, a technique in which two progressive-power lenses are used for counterbalancing or alleviating progressive change of the power in one lens for improving aberration and hence improving the visual field is proposed. However, it simply provides a monofocal view, and is not designed to be optimal for different applications.

SUMMARY

It is a first advantage of the invention to provide a combined spectacle lens which can change a design type of a progressive-power lens.

The sub-lenses used in the spectacle glasses of a front-hanging type described above are sunglasses for adjusting or polarizing light, or monofocal lenses for presbyopia eyes, and hence are intended to be worn in addition to the existing spectacle lenses. Therefore, positional accuracy of overlapped lenses is not very much necessary, and hence the overlapping position of both lenses must simply be approximate. In contrast, the case of the combined spectacle lens in which the design type of the progressive-power lens can easily be changed is fundamentally different from the case of the spectacle glasses of the front-hanging type, and the basic lens and the auxiliary lens both have a progressive-power surface, and hence a predetermined optical performance cannot be obtained unless these lenses are overlapped in an accurate positional relation when they are actually used.

It is a second advantage of the invention to provide a combined spectacle lens in which a basic lens and an auxiliary lens of the combined spectacle lens composed of a basic lens having a progressive-power and an auxiliary lens having a power to convert the design type of the basic lens can be combined in an accurate positional relation.

It is a third advantage of the invention is to provide the auxiliary lens which can change the design type or the like of the basic lens easily by being combined with the basic lens.

An assembly error when assembling the basic lens and the auxiliary lens for use may occur according to edging for machining the lens into a contour to be accommodated in the spectacle glass frame, and hence the assembly accuracy may not be secured depending on an edging accuracy.

In view of such a circumstance, it is a fourth advantage of the invention to provide a method of edging a combined spectacle lens which can secure assembly accuracy of the combined spectacle lens including a basic lens having a progressive power and an auxiliary lens having a power to convert the design type or the like of the basic lens.

In order to achieve the first advantage, the invention firstly provide a combined spectacle lens composed of a combination of a basic lens and an auxiliary lens, the basic lens formed with a progressive-power surface including a first power portion having a power for viewing an object at a predetermined distance, a second power portion having a power different from that in the first power portion, and a progressive portion in which the power is progressively changed from the first power portion to the second power portion on either one or both of refractive surfaces on an object-side and an eyeball side, wherein a resultant power obtained by combining a basic lens power of the basic lens and an auxiliary lens power of the auxiliary lens is partly or entirely different from that of the basic lens power.

By combining the auxiliary lens having a power which can partly or entirely change a power of the basic lens such as an addition power and a progressive corridor length with the basic lens, a design type of the basic lens can easily be changed.

The invention secondly provides the combined spectacle lens according to the first combined spectacle lens described above, wherein the resultant power/powers of one or both of an initial point of progressivity and a terminating point of progressivity of the combined spectacle lens is/are different from the power of the basic lens.

Since the resultant power of the combined spectacle lens including the auxiliary lens and the basic lens combined to each other is different from the power of the basic lens at least at one of the initial point of progressivity and the terminating point of progressivity, the design type of a progressive-power lens which is substantially determined by the addition power and the progressive corridor length can be changed.

The invention is thirdly provides the combined spectacle lens according to the second combined spectacle lens described above, wherein a combined spectacle lens addition power of the combined spectacle lens is different from a basic lens addition power of the basic lens.

Since the addition power of the combined spectacle lens including the auxiliary lens and the basic lens combined to each other (the combined lens addition power) is different from the addition power of the basic lens (basic lens addition power), the design type of the progressive-power lens which is substantially determined by the addition power and the progressive corridor length can be changed.

The invention is fourthly provides the combined spectacle lens according to the first combined spectacle lens described above, wherein the basic lens includes the progressive-power surface on the refractive surface on the eyeball side, and the refractive surface thereof on the auxiliary lens side is formed into a spherical surface or a toric surface, and the refractive surface of the auxiliary lens on the basic lens side is formed into the spherical surface or the toric surface which is the same as the refractive surface of the basic lens on the auxiliary lens side.

Since the refractive surface of the basic lens on the object side and the refractive surface of the auxiliary lens on the basic lens side (eyeball side) are both formed into the same spherical surface or the toric surface, the both lenses can be brought into tight contact with each other when being combined, and hence combination which is highly accurate in optical performance is achieved.

In order to achieve the second advantage described above, the invention fifthly provides a combined spectacle lens formed by combining a basic lens having a progressive-power surface or surfaces on one or both of refractive surfaces on an object side and an eyeball side and an auxiliary lens which provides a resultant power partly or entirely different from that of a basic lens power when being combined with the basic lens, wherein first alignment marks indicating a design reference position and a predetermined direction are provided at least at two points on either one of refractive surface of the basic lens, and second alignment marks indicating the design reference position and the predetermined direction are provided at least at two points on either one of refractive surfaces of the auxiliary lens.

Since the alignment marks indicating the design reference positions and the predetermined directions on both of the basic lens and the auxiliary lens, the basic lens and the auxiliary lens can be combined at an accurate position with reference to the alignment marks.

The invention sixthly provides the combined spectacle lens according to the fifth combined spectacle lens described above, wherein the first alignment marks are provided at positions indicating a fitting point and the horizontal direction.

It is necessary to provide alignment reference marks indicating the fitting point and the horizontal direction on the progressive-power lens. Therefore, it is efficient to use the alignment reference marks as the first alignment marks to be provided on the basic lens.

The invention seventhly provides the combined spectacle lens according to the fifth combined spectacle lens described above, wherein the second alignment marks are provided at positions aligned with the first alignment marks.

Since the first alignment marks and the second alignment marks are provided at positions which overlap with respect to each other, when the basic lens and the auxiliary lens are combined, whether these lenses are combined at an accurate positioning can be confirmed easily by viewing that these alignment marks are aligned.

In order to achieve the third advantage, the invention eighthly provides an auxiliary lens to be combined with a basic lens having a progressive-power surface having an area with no power in one or both of upper and lower side of a principal fixation line which coincides with a principal meridian of the basic lens.

In order to change the design type by the auxiliary lens without changing a basic visual field of the basic lens, it is necessary not to change one or both of the power on the upper side of the lens and the power on the lower side of the lens. Therefore, it is necessary to provide the auxiliary lens with the area having no power on one or both of the upper and lower sides of the principal fixation line.

The invention ninthly provides the auxiliary lens according to the eighth auxiliary lens described above, further including an area having the maximum or the minimum power in a midsection of the principal fixation line or an area having a constant power on one or both of the upper and lower sides of the principal fixation line.

In order to change the progressive corridor length of the basic lens, it is necessary to change the initial point of progressivity and the terminating point of progressivity, and hence the auxiliary lens needs to have a power which becomes the maximum or the minimum in the vicinity of the initial point of progressivity or the terminating point of progressivity of the basic lens. Alternatively, when only the addition power of the basic lens is to be changed, the auxiliary lens needs to have an area having a constant power in a portion corresponding to the area of the basic lens where the power is to be changed.

In order to achieve the fourth advantage, the invention tenthly provides a method of edging a combined spectacle lens including positioning refractive surfaces of a basic lens to be attached to a spectacle glass frame and an auxiliary lens to be combined with the basic lens to a predetermined relative position; bonding the positioned basic lens and the auxiliary lens with respect to each other; edging the basic lens and the auxiliary lens in a state of being bonded to each other; and separating the basic lens and the auxiliary lens.

If the basic lens and the auxiliary lens are edged separately, when they are combined with reference to their contours, respective edging errors are added, and hence positioning accuracy between the basic lens and the auxiliary lens may not be secured. In contrast, according to the method of edging the basic lens and the auxiliary lens in a bonded state, the edging errors are not added, and hence assembling accuracy when they are combined with reference to the contours can be secured.

The invention eleventhly provides the method of edging the tenth combined spectacle lenses, wherein the positioning step includes positioning so that the second alignment marks provided on the auxiliary lens with respect to the first alignment marks provided on the basic lens.

By the provision of the alignment marks for positioning respectively on the basic lens and the auxiliary lens, the both lenses can be positioned accurately with reference to these alignment marks.

The invention twelfthly provides a method of edging a combined spectacle lens according to the tenth method of edging the combined spectacle lens, wherein the basic lens formed with a progressive-power surface includes a first power portion having a power for viewing an object at a predetermined distance, a second power portion having a power different from that in the first power portion, and a progressive portion in which the power is progressively changed from the first power portion to the second power portion on either one or both of refractive surfaces on object side and an eyeball side, and a resultant power obtained by combining an auxiliary lens power of the auxiliary lens and a basic lens power of the basic lens is partly or entirely different from the basic lens power of the basic lens.

In the combined spectacle lens as proposed by the present inventors requires desirable assembling accuracy and it is effective to employ the method of edging according to an aspect of the invention.

The invention provides thirteenthly the method of edging the combined spectacle lens according to the twelfth method of edging the combined spectacle lens described above, wherein the basic lens includes the progressive-power surface on the refractive surface on the eyeball side, and the refractive surface thereof on the auxiliary lens side is formed into a spherical surface or a toric surface, and the refractive surface of the auxiliary lens on the basic lens side is formed into the spherical surface or the toric surface which is the same as the refractive surface of the basic lens on the auxiliary lens side.

Accordingly, the refractive surface of the basic lens on the auxiliary lens side (object side) and the refractive surface of the auxiliary lens on the basic lens side (eyeball side) can be brought into tight contact and bonded with each other when being combined.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of a combined spectacle lens, an auxiliary lens, and a method of edging the combined spectacle lens of the invention will be described below. However, the invention is not limited to the embodiment shown below.

Figure 1:
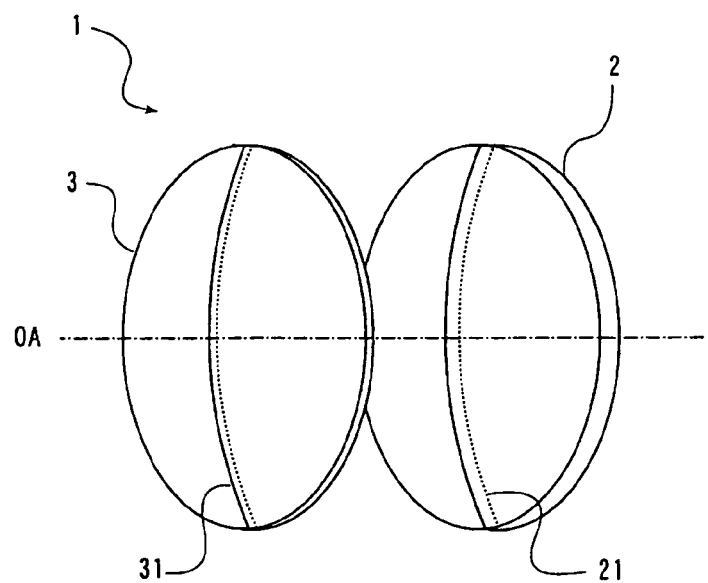
FIG. 1 is a perspective view showing a combined spectacle lens according to an aspect of the invention.

As shown in a perspective view in FIG. 1, a combined spectacle lens 1 of the invention includes a basic lens 2 which is a progressive-power lens and an auxiliary lens 3 used only for an application to be combined with the basic lens 2 and has a power to convert a design type of the basic lens 2. The basic lens 2 and the auxiliary lens 3 are used by being combined so as to align a principal meridian 21 of the basic lens 2 and a principal fixation line 31 of the auxiliary lens 3 to be aligned with the principal meridian 21, and align optical axes OA of the basic lens 2 and the auxiliary lens 3.

Figure 2:
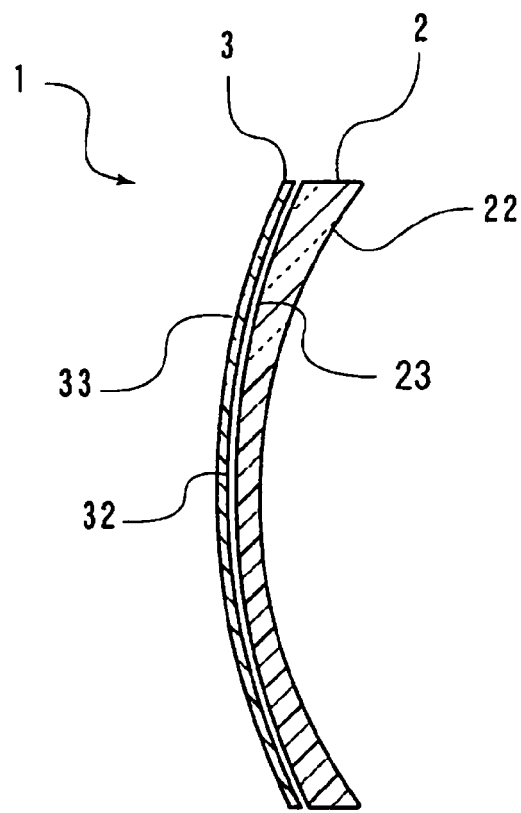
FIG. 2 is a cross-sectional view of the combined spectacle lens according to an aspect of the invention.

As shown in a cross-section of the combined spectacle lens 1 in FIG. 2, a combination mode in which the basic lens 2 is arranged on an eyeball side and the auxiliary lens 3 is arranged on an object side may be employed. It is also possible to arrange the basic lens 2 on the object side and the auxiliary lens 3 on the eyeball side. A progressive-power surface of the basic lens 2 may be provided on either a refractive surface 22 on the eyeball side or a refractive surface 23 on the object side. It may even be provided on both surfaces. The auxiliary lens 3 may also be provided a power on either a refractive surface 32 on the eyeball side or a refractive surface 33 on the object side for changing a power of the basic lens 2 (basic lens power) partly or entirely.

In order to combine the basic lens 2 and the auxiliary lens 3 in tight contact, it is preferable to provide the progressive-power surface on the refractive surface 22 of the basic lens 2 on the eyeball side, and form the refractive surface 23 on the object side into a spherical surface or a toric surface. On the other hand, it is preferable to form the refractive surface 32 of the auxiliary lens 3 on the eyeball side into the spherical surface or the toric surface having substantially the same curved surface as the refractive surface 23 of the basic lens 2 on the object side, and provide a power on the refractive surface 33 on the object side thereof for changing the power of the basic lens 2. By combining the basic lens 2 arranged on the eyeball side and the auxiliary lens 3 arranged on the object side, the refractive surface 23 of the basic lens 2 on the object side and the refractive surface 32 of the auxiliary lens 3 on the eyeball side come into tight contact with each other, so that the attached state of the auxiliary lens 3 is stabilized and both lenses 2, 3 are prevented from being displaced easily. Accordingly, positional accuracy is improved, and hence predetermined optical performance can be combined with high degree of accuracy.

Figure 3:
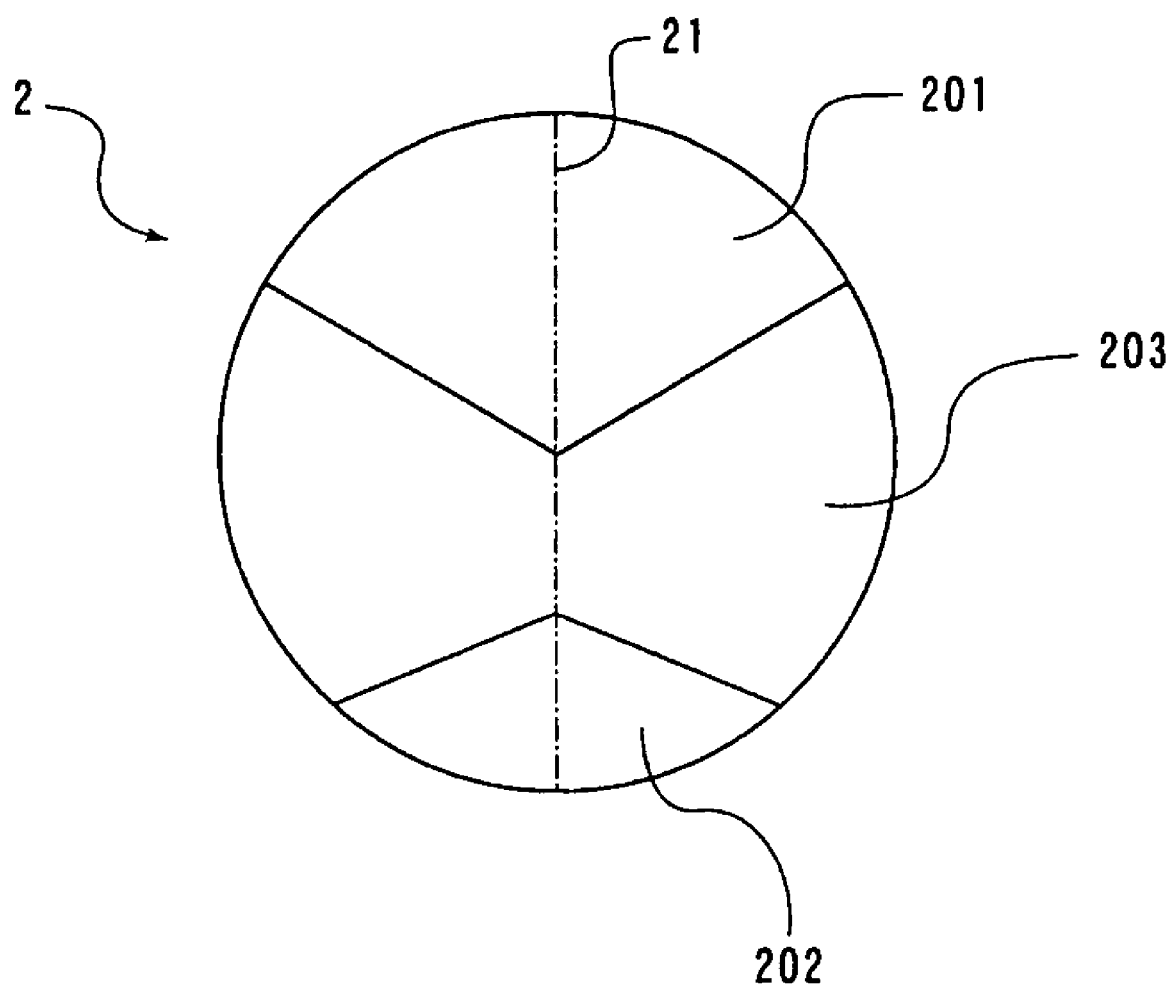
FIG. 3 is a conceptual drawing explaining distribution of bands of a basic lens.

The basic lens 2 used for the combined spectacle lens 1 is a normal progressive-power lens. As shown in a conceptual plan view in FIG. 3, the progressive-power lens 2 is a lens formed with a progressive power surface divided into a first power portion 201 having a power required for viewing an object at a predetermined distance, for example, at a remote distance or an intermediate distance, a second power portion 202 having a power different from that of the first power portion 201, for example, a power required for viewing an object nearby, and a progressive portion 203 in which the power is continuously changed between the first power portion 201 and the second power portion 202.

Figure 4:
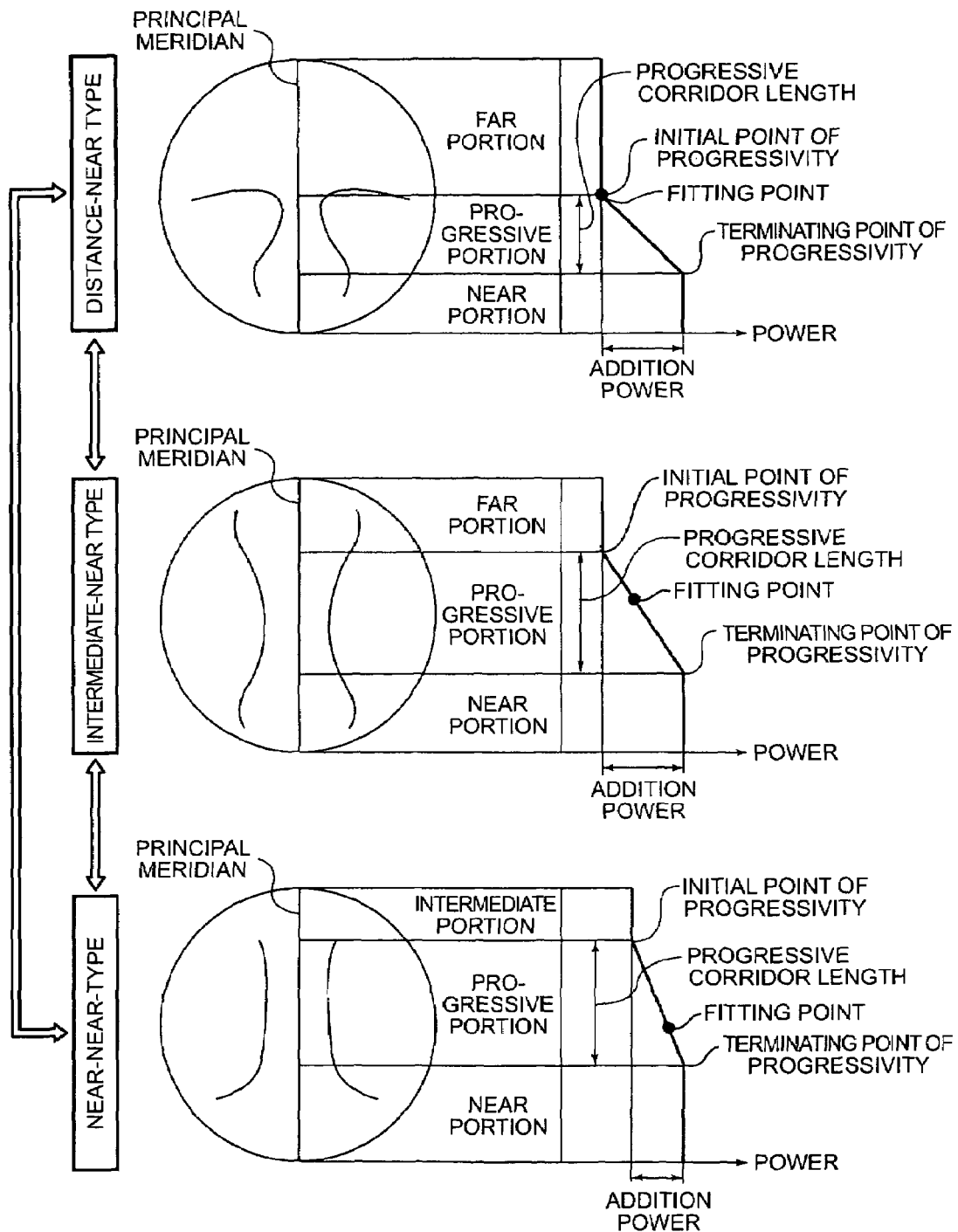
FIG. 4 is a conceptual drawing explaining a design type of a progressive-power lens.

FIG. 4 shows an example of a power distribution of the progressive-power lenses according to a design type for the respective applications. Powers shown in FIG. 4 are the powers on the principal meridian. The progressive-power lens of, so called, a distance-near type includes a distance portion on the upper side of the lens for viewing an object at a distance, a near portion on the lower side of the lens for viewing an object nearby, and a progressive portion in which the power is progressively changed between an initial point of progressivity on the upper side and a terminating point of progressivity on the lower side. The distance portion and the near portion are arranged in a balanced manner, and a progressive corridor length which corresponds to a distance from the initial point of progressivity to the terminating point of progressivity is set to a value between 10 and 16 mm so that an eye can be turned easily when viewing an object nearby. The difference of power between the initial point of progressivity and the terminating point of progressivity is referred to as an addition power. A fitting point generally coincides with a center of the distance part, that is, the initial point of progressivity.

The progressive-power lens of, so-called, an intermediate-near type includes a distance portion on the upper end portion of the lens for viewing an object at a distance, and a relatively large near portion on the lower side of the lens for viewing an object nearby, and a progressive portion located therebetween in which the power is progressively changed. A progressive corridor length is designed to be as long as a value between 19 and 25 mm for realizing a wide visual field in an intermediate view. The fitting point is generally at the progressive portion for viewing an object at a distance of about 1 m.

The progressive-power lens of, so-called, a near-near type includes an intermediate portion on the upper side of the lens for viewing an object at an intermediate distance, a relatively wide near portion on the lower side of the lens for viewing an object nearby, and a progressive portion located therebetween in which the power is progressively changed. The progressive corridor length is designed to be as long as a value between 19 and 25 mm for realizing a wide visual field in an intermediate view.

In addition, the design in terms of distribution of distortion aberration and astigmatism can be roughly categorized into an aberration concentrated type in which larger areas are secured for the distance portion and the near portion, and aberration is concentrated in a narrow progressive portion and an aberration diffused type in which the areas for the distance portion and the near portion are reduced, a larger area is secured for the progressive portion, and the aberration is diffused in the intermediate portion. The progressive-power lens used for the basic lens 2 may be any of these design types.

The auxiliary lens 3 is used by being combined with the basic lens 2 as described above. For example, it can be combined with the basic lens 2 of the distance-near type so that a resultant power obtained by being combined with the basic lens 2 of the distance-near type becomes the intermediate-near type or the near-near type. Alternatively, it can convert into the distance-near type by being combined with the basic lens of the intermediate-near type or the near-near type. It can also convert into the near-near type by being combined with the basic lens of the intermediate-near type, or vise-versa. The auxiliary lens 3 can be converted into the aberration diffused type by being combined with the basic lens 2 of the aberration concentrated type, or into the aberration concentrated type by being combined with the basic lens 2 of the aberration diffused type. In addition, the power of the distance portion or the near portion can be changed without changing the design type of the basic lens 2, that is, only the addition power can be changed.

The power of the auxiliary lens 3 (the auxiliary lens power) must be set so that the resultant power obtained by being combined with the basic lens power of the basic lens 2 corresponds to an intended power of the combined spectacle lens 1 to be obtained by conversion. In other words, it corresponds to a difference between the power of the basic lens 2 at a predetermined position and the intended power of the combined spectacle lens 1 to be obtained by conversion at a position corresponding to the predetermined position of the basic lens 2. Examples 1 to 3 will be shown below, and the power of the auxiliary lens 3 will be described in detail.

Figure 5A:
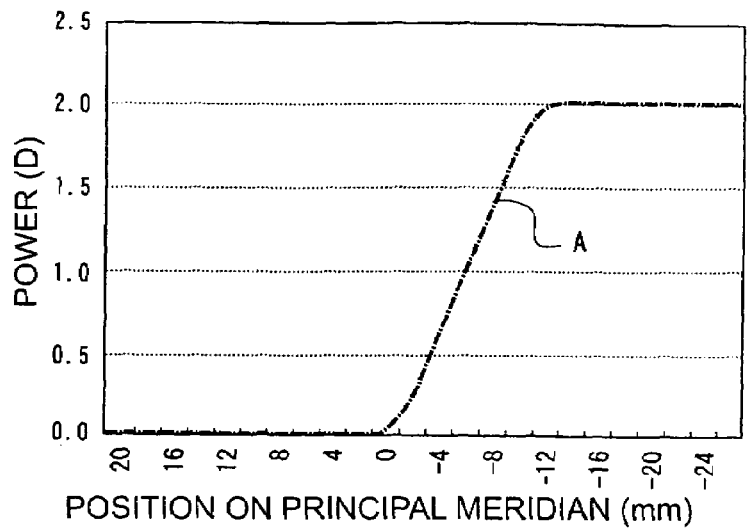
FIGS. 5A to 5C show graphs of variations in powers of the basic lens, an auxiliary lens, and the combined spectacle lens on respectively principal meridians in Example 1.
Figure 5B:
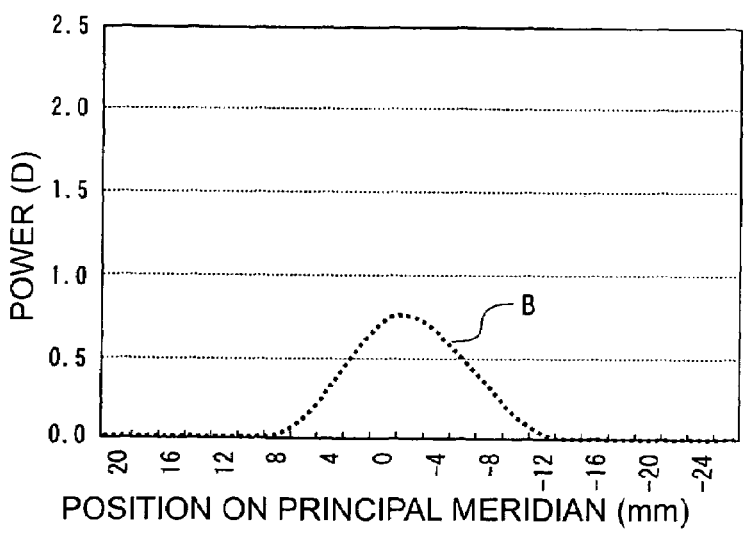
Figure 5C:
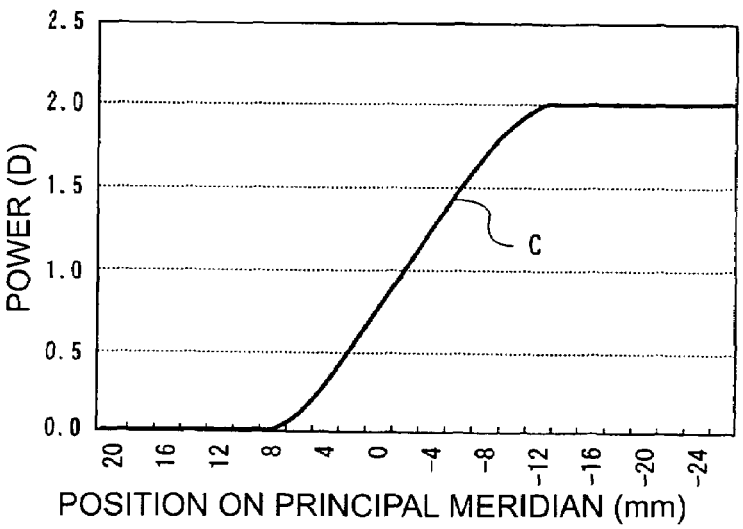

FIGS. 5A to C show graphs showing variations in powers of the basic lens, the auxiliary lens, and the combined spectacle lens on the respectively principal meridians (although it is actually the principal fixation line in the case of the auxiliary lens, since it corresponds to the principal meridians, it is referred to as "principal meridians" hereinafter for the sake of convenience) in a case in which a basic lens of the distance-near type and an auxiliary lens are combined to obtain a combined spectacle lens of the intermediate-near type as a first example. Positions on lateral axes on the principal meridians indicated by a numeral "0" indicate positions of the fitting points. Vertical axes represented by a unit of dioptre (D) indicate varied values of the power.

FIG. 5A shows a graph of a variation in power on the principal meridian of the basic lens. The variation in power on the principal meridian of the basic lens is such that addition of the power to a distance power is started at the fitting point and then a desired near power is achieved at a position 12 mm below the fitting point. The basic lens is a progressive-power lens of the distance-near type having a progressive corridor length of 12 mm and an addition power (basic lens addition power) of 2.0 dioptre.

FIG. 5C shows a graph of a variation in power on the principal meridian of a combined spectacle lens of the intermediate-near type which is intended to be obtained by combining the power of the auxiliary lens to the power of the basic lens. A variation in power on the principal meridian of the combined spectacle lens is such that the addition of the power starts to the distance power at a point 8 mm above the fitting point and the desired near power is achieved at a point 12 mm below the fitting point. The initial point of progressivity is at a point 8 mm above the fitting point, and the terminating point of progressivity is at a point 12 mm below the fitting point, and hence the progressive corridor length is 20 mm. The power is adapted so that an object at the intermediate distance is viewed through the position of the fitting point. The basic lens, the addition power, and the terminating point of progressivity are not changed. In conversion by the auxiliary lens, it is necessary to move the initial point of progressivity upward by 8 mm.

FIG. 5B shows a graph showing a variation in power of the auxiliary lens on the principal meridian. The power added by the auxiliary lens is a power shown by B in FIG. 5B which corresponds to the difference in power between the power shown by C in FIG. 5C and the power shown by A in FIG. 5A at a corresponding position. The variation in power of the auxiliary lens on the principal meridian is such that an area from the upper end to the point 8 mm above the fitting point which is the initial point of progressivity of the combined spectacle lens is the area whose power is zero. Then, the power increases from the point 8 mm above the fitting point, and reaches a maximum value at a point 2 mm below the fitting point, and then becomes "0" again at the terminating point of progressivity at 12 mm below the fitting point. An area below the terminating point of progressivity is the area whose power is zero.

The combined spectacle lens obtained by combining the basic lens as the progressive-power lens of the distance-near type having a power variation A shown in FIG. 5A and the auxiliary lens having a power variation B shown in FIG. 5B is a progressive-power lens of the intermediate-near type having a resultant power variation C shown in FIG. 5C.

When going out, the combination of the basic lens and the auxiliary lens can provide a comfortable visual field by using only the basic lens of the distance-near type which is intended mainly to be used for a distance view. When working in a room, by using the auxiliary lens combined to the basic lens, the resultant combined spectacle lens is converted into the intermediate-near type and hence a comfortable visual field can be obtained for the deskwork.

Figure 6:
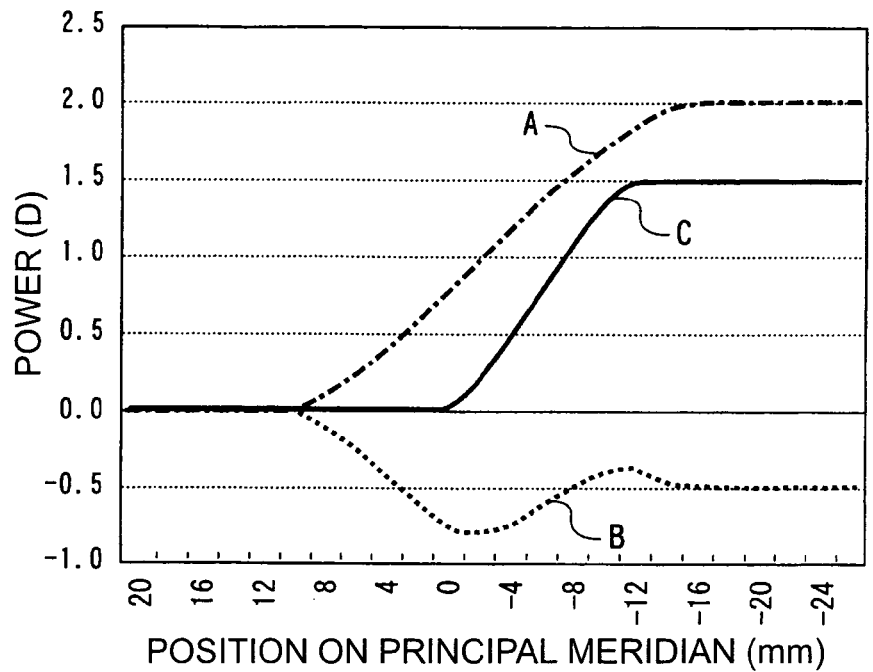
FIG. 6 is a graph of variations in powers of the basic lens, the auxiliary lens and the combined spectacle lens on the respective principal meridians in Example 2.

FIG. 6 is a graph of variations in powers of the basic lens, the auxiliary lens and the combined spectacle lens on the respective principal meridians in a case in which the basic lens of the intermediate-near type is combined with the auxiliary lens to obtain the combined spectacle lens of the distance-near type as a second example. A position of the principal meridian where the numeral is "0" is a position of the fitting point. The unit of the power on the vertical axis is dioptre (D) which indicates a varied value of the power.

A Variation in power of the basic lens on the principal meridian is shown by an alternate long and short dash line of A, a variation in power of the auxiliary lens on the principal meridian is shown by a broken line of B, and a variation in power of the combined spectacle lens on the principal meridian is shown by a solid line of C. The power of the auxiliary lens shown by the broken line B is a value obtained by subtracting the power of the combined spectacle lens shown by the solid line C from the power of the basic lens shown by the alternate long and short dash line A at a position on the same principal meridian.

The basic lens is an intermediate-near type having the initial point of progressivity at a position above 10 mm from the fitting point, the terminating point of progressivity at a position 14 mm below the fitting point, the progressive corridor length is 24 mm, and the addition power of the basic lens is 2.0 dioptre.

The auxiliary lens has an area whose power is "0" on the upper portion thereof, and a minus power is added from the initial point of progressivity of the basic lens. Then, a point of the minimum power exists at a position 2 mm below the fitting point, and a point of the maximum power exists in the vicinity of the position corresponding to the terminating point of progressivity of the combined glass lens. The portion below the terminating point of progressivity of the basic lens has a constant power of −0.5 dioptre.

The initial point of progressivity of the resultant power of the combined spectacle lens obtained by combining the basic lens power and the auxiliary lens power is a fitting point, and the terminating point of progressivity thereof is at 12 mm of the fitting point. The progressive corridor length thereof is 12 mm, and the addition power (combined lens addition power) is 1.5 dioptre. In this example, the initial point of progressivity, the terminating point of progressivity, and the addition power of the basic lens are changed by the auxiliary lens.

In Example 2, the combined spectacle lens obtained by combining the basic lens as the progressive-power lens of the intermediate-near type having the power variation A shown in FIG. 6 and the auxiliary lens having the power variation B is converted into the progressive-power lens of the distance-near type having the resultant power variation C.

With the combination of the basic lens and the auxiliary lens, when working in a room, a comfortable visual field for the deskwork can be obtained only with the basic lens of the intermediate-near type, and when going out, a comfortable visual field can be obtained by attaching the auxiliary lens to convert into the combined spectacle lens of the distance-near type as well as by the benefit of reduction of the addition power.

Figure 7:
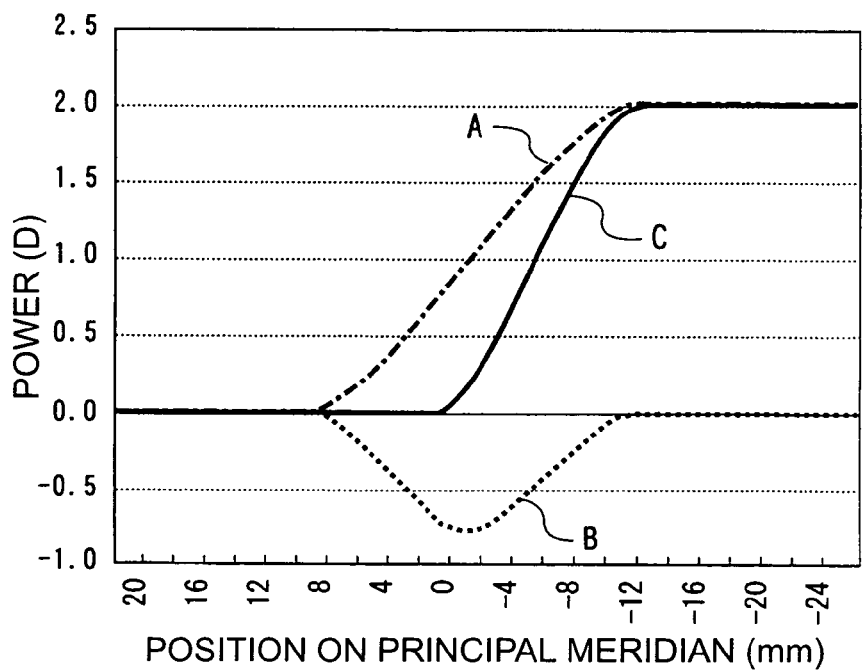
FIG. 7 shows a graph of variations in powers of the basic lens, the auxiliary lens, and the combined spectacle lens on the respective principal meridians in Example 3.

FIG. 7 shows a graph of variations in powers on the respective principal meridians of the basic lens, the auxiliary lens, and the combined spectacle lens in a case of the combined spectacle lens of the distance-near type obtained by combining the basic lens of the intermediate-near type and the auxiliary lens as Example 3. A position of the principal meridian where the numeral is "0" is a position of the fitting point. The unit of the power on the vertical axis is dioptre which indicates a varied value of the power.

In FIG. 7, a variation in power on the principal meridian of the basic lens is shown by the alternate long and short dash line of A, a variation in power of the auxiliary lens on the principal meridian is shown by the broken line of B, and a variation in power of the combined spectacle lens on the principal meridian is shown by the solid line of C. The power of the auxiliary lens shown by the broken line B is a value obtained by subtracting the power of the combined spectacle lens shown by the solid line C from the power of the basic lens shown by the alternate long and short dash line of A on the same principal meridian.

The variation in power of the basic lens on the principal meridian is such that addition of the power to the distance power starts from a point 8 mm above the fitting point and reaches a desired near power at a point 12 mm below the fitting point. The variation in power of the auxiliary lens on the principal meridian is such that the area from the upper end to a point 8 mm above the fitting point is the area whose power is "0", and the power is reduced from the point 8 mm above the fitting point and reaches a largest minus value at a point 2 mm below the fitting point. Then, the power is increased and reaches zero again at a point 12 mm below the fitting point, and the remaining area is an area whose power is "0". The variation in power on the principal meridian of the combined spectacle lens obtained by combining the basic lens and the auxiliary lens as described above is started in addition of the power from the fitting point and the predetermined near power is achieved at a point 12 mm below the fitting point.

By the combination of the progressive-power lens of the intermediate-near type having the progressive corridor length of 20 mm and the addition power of 2.0 dioptre as the basic lens with the power of the auxiliary lens, the combined spectacle lens is converted into the progressive-power lens of the distance-near type having the progressive corridor length of 12 mm and the addition power of 2.0 dioptre.

When working in a room, a comfortable visual field for the deskwork is obtained only by the basic lens of the intermediate-near type. When going out, the comfortable visual field can be obtained by attaching the auxiliary lens to obtain the combined spectacle lens of the distance-near type.

In this manner, the auxiliary lens preferably changes the power of the basic lens not entirely but partly, and when converting the design type, has an area whose power is "0" on either one of the upper or lower side of the principal fixation line which corresponds to the principal meridian line of the basic lens. When changing the initial point of progressivity or the terminating point of progressivity of the basic lens, the auxiliary lens has a portion whose power is the maximum or the minimum in the intermediate section of the main fixation line. However, when changing only the addition power of the basic lens, it does not have the portion whose power is the maximum or the minimum, and a portion having a constant power exists in only one of the upper or lower side of the principal fixation line.

The auxiliary lens must simply have a function of supplementing the power of the basic lens, and hence it is not necessary to have a large variation of the power. The shape of the refractive surface that can realize the power of the auxiliary lens shown in the examples described above is ±0.2 mm for an approximate spherical shape and has a substantially constant thickness. Therefore, the thickness of the auxiliary lens can be reduced. Since the thickness can be reduced, the auxiliary lens may be an adhering type. Since the thickness of the auxiliary lens can be reduced, the weight is not increased so much even when it is combined with the basic lens, and hence the comfort of wearing is not impaired and the appearance is also good.

The auxiliary lens of the combined spectacle lens according to an aspect of the invention can be reduced in thickness, and hence light permeability as well as the power can be changed for outdoor use by dying the lens to add a function as sunglasses or by using modulating material or polarizing material, which comes in further useful.

Since the combined spectacle lens of the invention can convert the design type of the basic lens easily by combining the auxiliary lens therewith, by providing a several types of auxiliary lens, the visual field which is adapted to the environment at low cost without purchasing an additional spectacle glass frame by replacing the auxiliary lens according to the environment in which the spectacle lens is used, or by using only the basic lens without using the auxiliary lens.

In addition, in the case in which the power of the eye of a person who wears eyeglasses is changed, and hence it becomes necessary to change the power of the distance portion or the near portion as well, he/she must simply purchase the auxiliary lens which can change only the distance power or the near power and attaching the same on the basic lens without changing the design type of the basic lens. Since what is necessary is only to purchase a new auxiliary lens without replacing the spectacle lens, the comfortable visual field can be continuously secured at low cost according to the change of the power of the eye.

A method of using the combined spectacle lens 1 according to an aspect of the invention is preferable such that the basic lens 2 is fitted in the spectacle glass frame as the normal progressive-power lens, and the auxiliary lens 3 is detachably attached to the basic lens 2. When in use, both of the basic lens 2 and the auxiliary lens 3 of the combined spectacle lens 1 of the invention have the progressive refractive surfaces, the desired optical performance cannot be obtained unless both of the basic lens 2 and the auxiliary lens 3 are overlapped at an accurate position. When the relative position is displaced, the optical performance of the basic lens 2 is impaired by the auxiliary lens 3, and hence the comfortable visual field cannot be obtained.

Therefore, in the combined spectacle lens 1 of the invention, preferably, first alignment marks for positioning are provided on at least two positions on either one of refractive surfaces of the basic lens 2, and second alignment marks for positioning are provided at least two positions of either one of the refractive surfaces of the auxiliary lens 3. The first alignment marks on the basic lens 2 are formed to indicate a design reference position and a predetermined direction, and the second alignment marks are formed to indicate the design reference position and the predetermined position. In the combined spectacle lens 1 of the invention, relative positional accuracy after being combined can be secured by combining the basic lens 2 and the auxiliary lens 3 with reference to the respective positions of the first alignment marks and the second alignment marks.

Figure 8A:
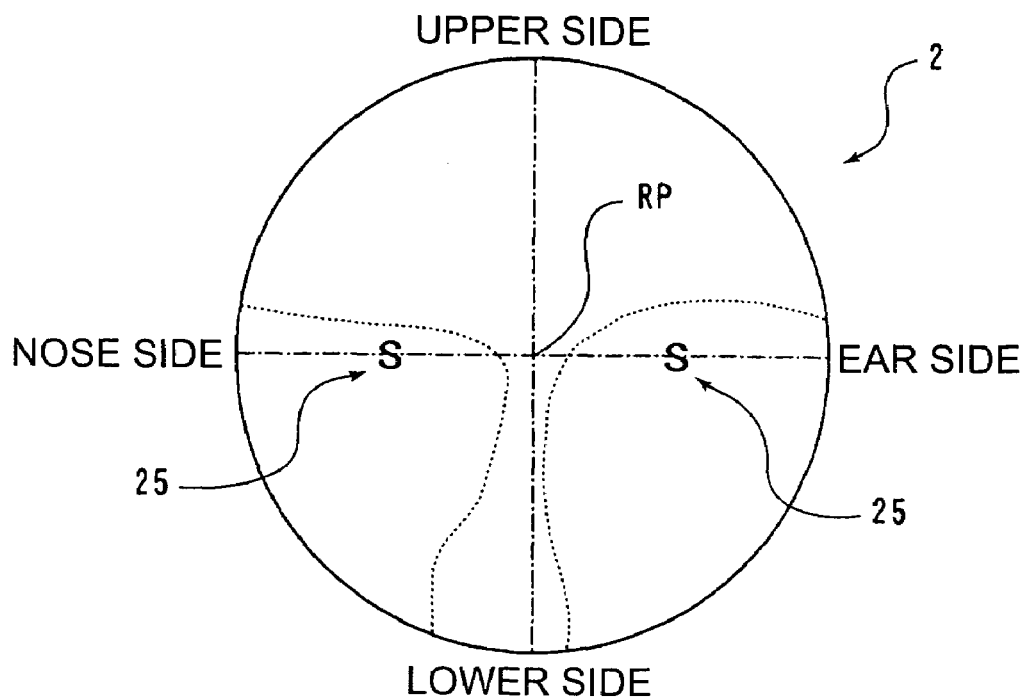
FIGS. 8A and 8B are front views showing examples of alignment marks provided on the basic lens and the auxiliary lens.
Figure 8B:
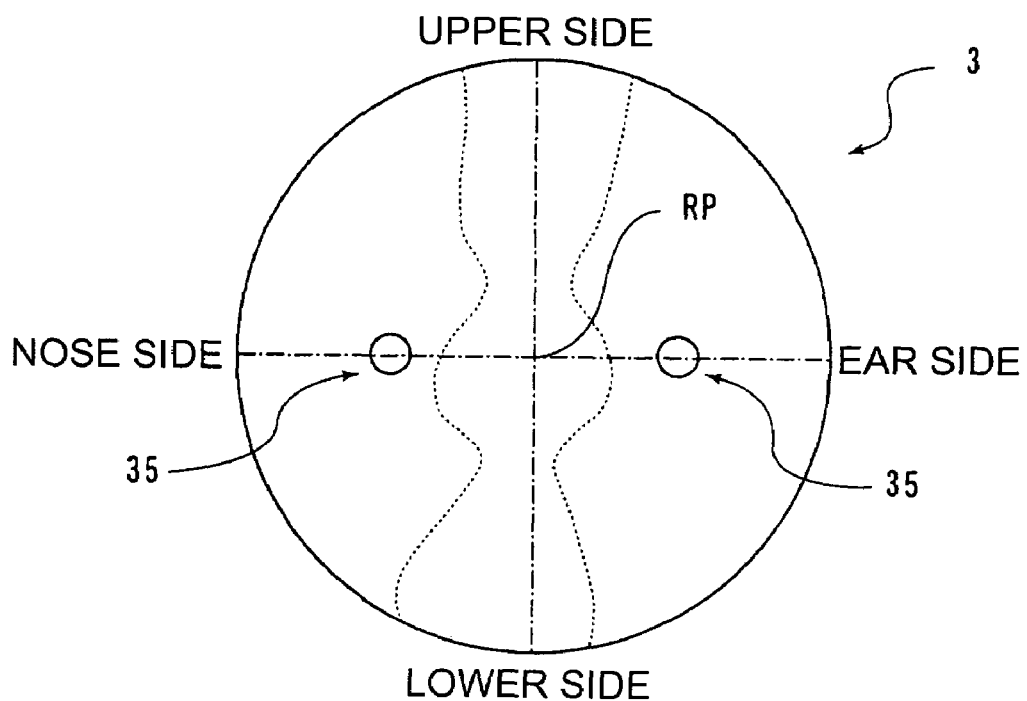
Figure 9:
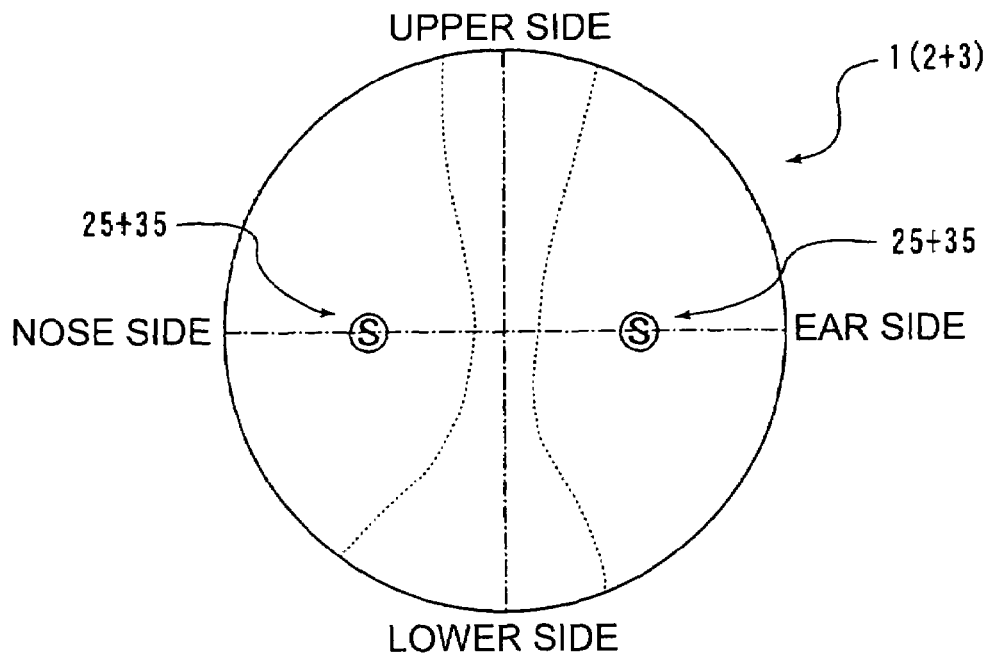
FIG. 9 is a front view showing a combination of the alignment marks of the combined spectacle lens.

FIG. 8A is a plan view showing an example in which first alignment marks 25 are provided on the basic lens 2 having the progressive power of the distance-near type. FIG. 8B is a plan view showing an example in which second alignment marks 35 are provided on the auxiliary lens 3 having the power which can convert the progressive power of the basic lens 2 into the intermediate-near type. FIG. 9 is a plan view showing an overlapped state between the first alignment marks 25 and the second alignment marks 35 of the combined spectacle lens 1 in which the resultant power obtained when the basic lens 2 and the auxiliary lens 3 are overlapped has the progressive power of the intermediate-near type. In FIGS. 8A and 8B and FIG. 9, distributions of aberration of the respective lenses are shown schematically by broken lines.

As shown in FIG. 8A, the progressive-power lens as the basic lens 2 at least has a vertical direction, and in addition, when a second power portion is displaced toward a nose side by adding convergence, it has a lateral direction between the nose side and an ear side. Likewise, the auxiliary lens 3 to be combined with the basic lens 2 also has the vertical direction and the lateral direction as shown in FIG. 8B. The lenses shown in FIGS. 8A and 8B and FIG. 9 are lenses for the left eye, and hence the second power portion is displaced toward the nose side. In order to position and combine the basic lens 2 and the auxiliary lens 3 at accurate positions, it is necessary that the alignment marks 25, 35 indicate the reference positions and also the predetermined direction accurately.

According to an aspect of the invention, the first alignment marks 25 are provided on the basic lens 2 at least two positions on one or both of the refractive surface 23 on the object side or the refractive surface 22 on the eyeball side. By providing the first alignment marks 25 at least at two positions, the design reference position can be found from these positions, and from these positions, the position of the fitting point in the predetermined direction, for example, in the horizontal direction and/or in the vertical direction can be indicated. The basic lens 2 is a normal progressive-power lens, and it is obliged to provide alignment reference marks on the progressive-power lens under the regulation of ISO or JIS. The positions to provide the alignment reference marks are specified to be two positions 34 mm apart from each other in the horizontal direction on the lens. Since the positions to provide the alignment reference marks are within the visual field, it is formed as hidden marks in an unostentatious manner. It is radical to use the alignment reference marks which are essentially provided as the first alignment marks 25 on the basic lens. However, it is also possible to provide separately from the alignment reference marks.

The two first alignment marks 25 shown in FIG. 8A employs the alignment reference marks without modification, and two letters "S" are provided at positions apart from each other by 34 mm in the horizontal direction with the intermediary of the design reference position. In many cases, the fitting point is the same as the design reference position or is provided perpendicularly above the design reference position by a predetermined distance (1 mm to 4 mm), and the positions are notified by a manufacturer. Therefore, a user can find the fitting point from the alignment reference marks. Since the alignment reference marks also have a function to indicate a manufacturer or to differentiate the products thereof in many cases, there is a case in which a logo mark on the basis of an alphabet is used. Although the logo mark representing the manufacture is employed in this example as well, it may be any symbol as a matter of course. A center of the two first alignment marks 25 is a design reference position RP, a line connecting the centers of the two first alignment marks 25 indicates a horizontal line, and a line orthogonal to the horizontal line and passing through the design reference position RP indicates the vertical direction. The fitting point can be found from a design reference point and the direction.

According to an aspect of the invention, at least the two second alignment marks 35 are provided on one or both of the refractive surface 33 of the auxiliary lens 3 on the object side or the refractive surface 32 thereof on the eyeball side. In FIG. 8B, the second alignment marks 35 are overlapped with the first alignment marks 25 respectively with centers at the same positions, and are provided as circular lines of a size so as to surround the first alignment marks 25 respectively. In other words, the two circular lines are provided so that the centers thereof are positioned apart from each other by 34 mm with the intermediary of the design reference point at the center in the horizontal direction. A center point between the centers of the two alignment marks 35 corresponds to the design reference position RP, a line connecting the centers of the two second alignment marks 35 indicates the horizontal direction, and the line orthogonal to the horizontal line and passing through the design reference position RP indicates the vertical direction. The fitting point can be found in the same manner as the basic lens. The second alignment marks 35 may be provided at positions irrelevant to the positions of the first alignment marks 25 as long as they can indicate the design reference position RP of the auxiliary lens 3 corresponding to the design reference position RP indicated by the first alignment marks 25 and the certain direction, for example, the horizontal direction and/or the vertical direction.

As shown in FIG. 9, when the basic lens 2 and the auxiliary lens 3 are overlapped with each other with the design reference positions RP and the horizontal directions thereof aligned to each other, the basic lens 2 and the auxiliary lens 3 are combined accurately, and the progressive-power lens of the intermediate-near type having the intended resultant power of the combined spectacle lens 1 is obtained. When the lenses are viewed from the front side in the combined state, the second alignment marks 35 are arranged so as to surround the first alignment marks 25, and overlapped with the centers aligned with each other. By checking that these alignment marks 25, 35 are overlapped with respect to each other, the fact that the lenses are combined with an accurate relative positioning can easily be confirmed. The two second alignment marks 35 of the auxiliary lens 3 shown in FIG. 8 and FIG. 9 are circular and, although the vertical direction cannot be determined from the second alignment marks 35, it is not inconvenient since the auxiliary lens 3 includes various information as the hidden mark, and the vertical direction can be easily determined from these marks.

It is preferable to provide the first alignment marks 25 and the second alignment marks 35 respectively on the sides of the basic lens 2 and the auxiliary lens 3 coming into tight contact with each other. For example, as shown in FIG. 2, when the auxiliary lens 3 is attached to the front surface of the basic lens 2, the first alignment marks 25 are preferably provided on the refractive surface 23 of the basic lens 2 on the object side, and the second alignment marks 35 are preferably provided on the refractive surface 32 of the auxiliary lens 3 on the eyeball side, respectively. In this case, since the basic lens 2 and the auxiliary lens 3 are combined in tight contact with each other, preferably, the refractive surface 22 of the basic lens 2 on the eyeball side is formed into the progressive-power surface and the refractive surface 23 thereof on the object side is formed into the spherical surface or the toric surface. On the other hand, preferably, the refractive surface 32 on the eyeball side of the auxiliary lens 3 is formed into the spherical surface or the toric surface having substantially the same curved surface with the refractive surface 23 of the basic lens 2 on the object side, so as to provide the refractive surface 33 on the object side with a power to change the power of the basic lens 2. By providing the first alignment marks 25 and the second alignment marks 35 on the sides which come into tight contact with each other, a distance from each other is extremely shortened, so that accurate overlapping of the centers of the alignment marks 25, 35 and hence accurate overlapping of the basic lens 2 and the auxiliary lens 3 are enables, and the fact that they are overlapped with accuracy can easily be confirmed.

The first alignment marks 25 and the second alignment marks 35 can be provided respectively by known marking methods. For example, any methods such as a method of providing the marks by transferring from the die at the time of cast polymerization of a plastic lens, a method of marking-off with a diamond pen or the like, a method of marking with a laser beam, and so on may be employed. In any methods, it is preferable to provide the same as the hidden marks in an unostentatious manner. The hidden marks are not viewed in a normal state, but are thin marks which become visible when it is held up near a light source and does not impair the visual field.

When the basic lens 2 is fitted into the spectacle glass frame, the basic lens 2 is cut and machined so as to match the edge of the spectacle glass frame, and fitted thereto while confirming the fitting point of the lens and the horizontal direction thereof with reference to the first alignment marks (alignment reference marks) 25 or by a layout print printed with reference thereto.

The auxiliary lens 3 is generally edged into the same shape as the basic lens 2 in many cases, and when it is edged, it is cut and machined into the same shape as the basic lens while confirming the fitting point of the lens and the horizontal direction with reference to the second alignment marks 35 or by the layout print printed with reference thereto. The second alignment marks 35 are also used for confirming the reference position and the direction of positioning when the auxiliary lens 3 is attached to the basic lens 2.

The second alignment marks shown in FIGS. 8A and 8B and FIG. 9 have a circular shape. However, the second alignment mark may be of any sign and is also possible to employ a polygonal shape such as triangle or square so as to surround the first alignment marks, or a mark which is composed of three lines in the horizontal direction and the vertical direction so that it can also indicate the vertical direction.

In the combined spectacle lens which can convert the design type according to an aspect of the invention, since both of the basic lens 2 and the auxiliary lens 3 have the progressive refractive surfaces as described above, the intended optical performance cannot be obtained in actual use unless they are overlapped with each other in an accurate relative position. If the basic lens 2 and the auxiliary lens 3 can be edged into the completely same contour for fitting the same into the spectacle glass frame, they can be overlapped with the accurate relative position even when they are combined with reference to the outer shape, and the good appearance is realized.

Figure 10:
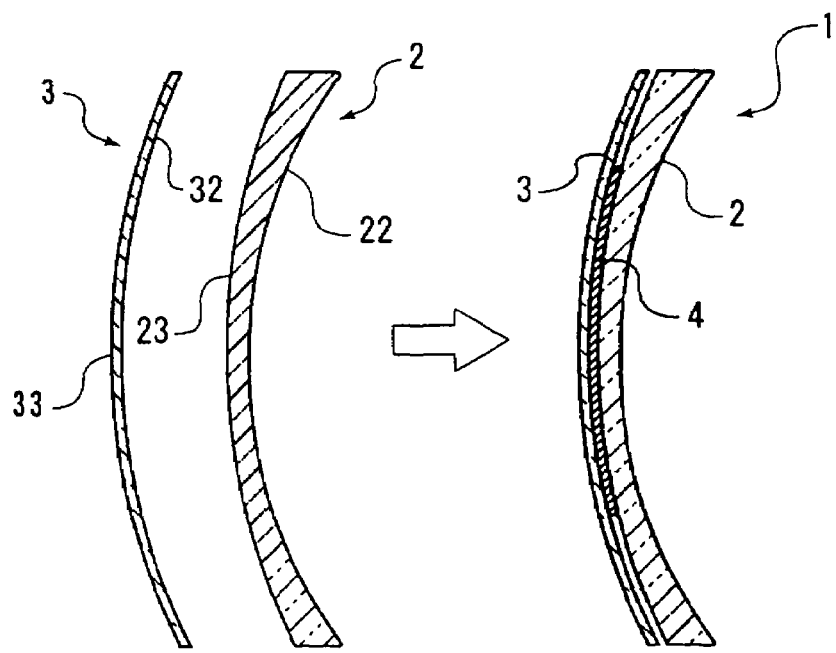
FIG. 10 is a cross-sectional view of a lens showing an adhering process of an edging method according to an aspect of the invention.

Referring now to the drawings, an embodiment of a method of edging lenses according to an aspect of the invention which can edge the basic lens 2 and the auxiliary lens 3 into completely the same outer shape will be described in detail. FIG. 10 is a cross-sectional view of the lens showing a bonding step in the edging method according to an aspect of the invention, and FIG. 11 is a front view of the lens for explaining the process of the edging method according to an aspect of the invention.

Figure 11A:
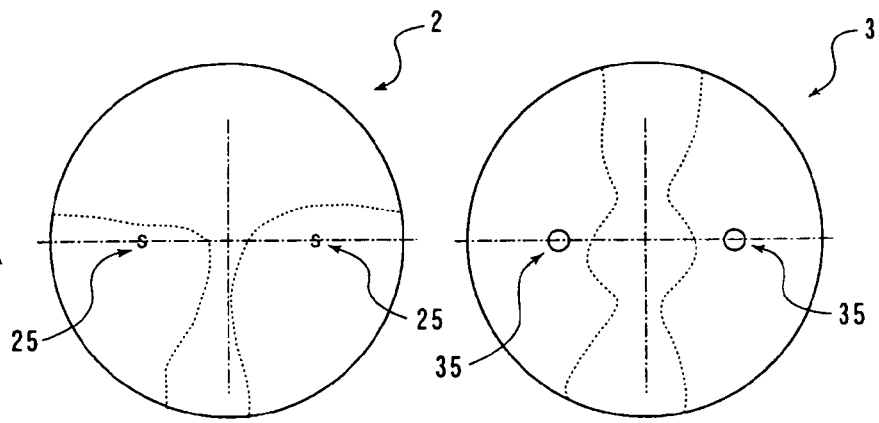
FIGS. 11A to 11D are front views of the lens for explaining a process of the edging method according to an aspect of the invention.

As shown in FIG. 11A, the circular basic lens 2 and the circular auxiliary lens 3 to be combined are prepared. In the embodiment shown in FIG. 10 and FIGS. 11A to 11D, the combined spectacle lens 1 including the basic lens 2 having the progressive-power and the auxiliary lens 3 having the progressive-power which can convert the design type of the basic lens 2 proposed by the present inventor is shown. In FIGS. 11A to 11D, distributions of aberration of the respective lenses are schematically shown by broken lines. With the lenses shown in the drawing, an example in which the basic lens 2, being the progressive-power lens of the distance-near type is combined with the auxiliary lens 3, and the resultant power of the combined spectacle lens 1 is converted into the intermediate-near type is described. The progressive-power surface is provided on the refractive surface 22 of the basic lens 2 on the eyeball side, and the refractive surface 23 on the object side is formed into a spherical surface. The refractive surface 32 of the auxiliary lens 3 on the eyeball side is formed into the spherical surface which is the same as the refractive surface 23 of the basic lens 2 on the object side, and the a power to change the power of the basic lens 2 is provided to the refractive surface 33 on the object side. By using the basic lens 2 and the auxiliary lens 3, the refractive surface 32 of the auxiliary lens 3 on the eyeball side can be brought into tight contact with the refractive surface 23 of the basic lens 2 on the object side.

As shown in FIG. 11A, the refractive surface 23 of the basic lens 2 as the progressive-power lens on the object side is formed with the alignment reference marks 25 as the first alignment marks of the letter "S" as logos for indicating a fitting point or the design reference point which is a reference point for defining the fitting point and the horizontal direction at two positions as the hidden marks. As described above, it is obliged to provide the alignment reference marks 25 on the progressive-power lens under the regulation of ISO or JIS, and the positions to provide the alignment reference marks 25 are specified to be two positions 34 mm apart from each other in the horizontal direction on the lens. The intermediate position of the two alignment reference marks 25 is a fitting point or the design reference point which is a reference point for defining the fitting point, which is shown by an intersection between a horizontal reference line and a vertical reference line shown by virtual alternate long and short dash lines.

As shown in FIG. 11A, the second alignment marks 35 are provided on the refractive surface 32 of the auxiliary lens 3 on the eyeball side at positions overlapping with the alignment reference marks 25 on the basic lens 2 as the hidden marks. The second alignment marks 35 shown in the drawing are circular shape so as to surround the alignment reference marks 25. However, the second alignment marks 35 may be of any shape. The distance between the centers of the second alignment marks 35 is 34 mm in horizontal measurement. A center point of a line connecting the centers of the two second alignment marks 35, 35 is a fitting point of the auxiliary lens 3 or a design reference point as the reference point for defining the fitting point.

Figure 11B:
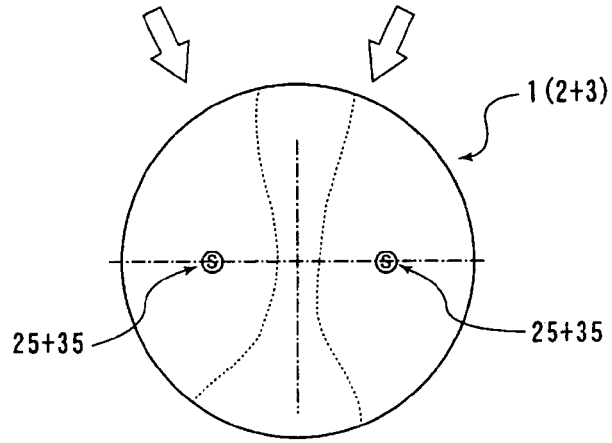

In the edging method according to an aspect of the invention, it is necessary to position the basic lens 2 and the auxiliary lens 3 accurately in a positioning step. The refractive surface 32 of the auxiliary lens 3 on the eyeball side is arranged in the proximity of the refractive surface 23 of the basic lens 2 on the object side and, as shown in FIG. 11B, the auxiliary lens 3 or the basic lens 2 is moved to a relative position so that the second alignment marks 35 of the auxiliary lens 3 surround the alignment reference marks 25 of the basic lens 2 when viewed in the direction of an optical axis. Accordingly, the centers of the alignment reference marks 25 and the centers of the second alignment marks 35 are aligned with each other, and hence the design reference position of the basic lens 2 and the design reference position of the auxiliary lens 3 are aligned. Simultaneously, the horizontal directions are aligned with each other, that is, the fitting points are aligned with each other, whereby the relative position of the refractive surfaces of the basic lens 2 and the auxiliary lens 3 is accurately positioned.

After having positioned, an adhesive agent layer 4 is provided in the area within a range of edging at a center portion of the basic lens 2 or the auxiliary lens 3 using a pressure sensitive adhesive double coated tape in the bonding step. Then, the auxiliary lens 3 is pressed against the basic lens 2 while maintaining the relative position between the basic lens 2 and the auxiliary lens 3, and as shown in FIG. 10, the auxiliary lens 3 is adhered to the basic lens 2 via the adhesive agent layer 4 and fixed so that the relative position is not displaced. In order to facilitate separation, the adhesive agent layer 4 employed here is preferably of a type having a property which normally presents a strong adhesive force but is cured and hence significantly reduced in adhesive force when ultraviolet light or electron beam, for example, is irradiated.

Figure 11C:
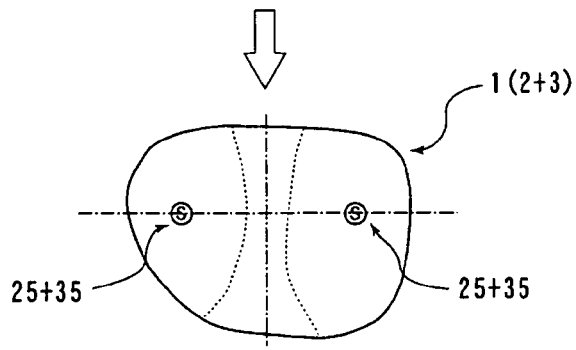

Subsequently, in an edging process, both of the basic lens 2 and the auxiliary lens 3, being in the adhered state, are ground with a grinding stone of an edging device, not shown, into a shape to be fitted into the spectacle glass frame as in the normal edging process. In the case of edging, the alignment reference marks 25 are used as machining reference points indicating a reference position and the direction. As shown in FIG. 11C, the basic lens 2 and the auxiliary lens 3 are machined into the same outer shape by the edging process.

Figure 11D:
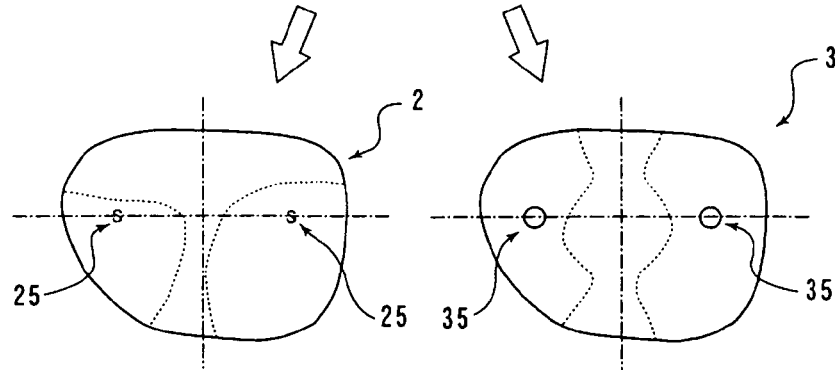

After having edged, ultraviolet light is irradiated onto the adhesive agent layer 4 between the basic lens 2 and the auxiliary lens 3 to significantly reduce the adhesive force of the adhesive agent layer 4 and, as shown in FIG. 11D, the basic lens 2 and the auxiliary lens 3 are separated. The separated basic lens 2 is used by being attached to the spectacle glass frame. The auxiliary lens 3 is used by being detachably attached to the basic lens 2 when needed.

In this manner, according to the edging method according to an aspect of the invention, the basic lens and the auxiliary lens are edged in the adhered state. When the basic lens and the auxiliary lens are edged separately as in the related art, edging errors may occur in each edging process. Therefore, the edging errors are added when they are fitted into the frame and combined with each other with reference to the outer shapes thereof, and the assembly accuracy required for the basic lens and the auxiliary lens cannot be secured any longer. Consequently, the optical performance obtained by combining the basic lens and the auxiliary lens may be deteriorated due to the assembly error, and hence the predetermined optical performance may not be demonstrated. In contrast, according to the method of edging a lens according to an aspect of the invention in which the basic lens and the auxiliary lens are edged in the adhered state, the machining error during the edging process is not added and hence the assembly accuracy can be secured when the lenses are fitted in the frame and combined with reference to the outer shape. The basic lens and the auxiliary lens can be edged into the same outer shape. By forming the basic lens and the auxiliary lens into the same outer shape, they can be combined in an accurate position with reference to the outer shape when they are assembled. When the basic lens and the auxiliary lens have the same outer shape, the attached auxiliary lens is unremarkable and is preferable in appearance. Since the basic lens and the auxiliary lens can be edged with one edging process, productivity may be improved. In addition, by performing processing such as embedding a magnet or metal or punching in a state in which the basic lens and the auxiliary lens are adhered, processing with high degree of positional accuracy can be performed for both of the basic lens and the auxiliary lens.

In the description above, the case in which the hidden alignment reference marks are used as the first alignment marks and the hidden alignment marks are used as the second alignment marks has been described. However, they may be other marks as long as positioning can be achieved, and, for example, a notch or a projection and a depression may be provided on the periphery or the side surface of the lens.

The combined spectacle lens of the invention can be used as a vision correction lens mainly for a person having presbyopia eyes with low amplitude of accomodation.

The auxiliary lens of the invention can be used in an application to change the design type of the basic lens by being combined with the basic lens for vision correction mainly for a person having presbyopia eyes with low amplitude of accomodation.

The method of edging of the combined spectacle lens of the invention can be used for machining the basic lens and the auxiliary lens into the shapes to be attached to the spectacle glass frame.

What is claimed is:

1. A combined spectacle lens comprising a combination of a basic lens and an auxiliary lens used only for an application to be combined with the basic lens and has a power to convert a design type of the basic lens, the basic lens formed with a progressive-power surface including a first power portion having a power for viewing an object at a predetermined distance, a second power portion having a power different from that in the first power portion, and a progressive portion in which the power is progressively changed from the first power portion to the second power portion on either one or both of refractive surfaces on an object side and an eyeball side,
    wherein a resultant power obtained by combining a basic lens power of the basic lens and an auxiliary lens power of the auxiliary lens is partly or entirely different from that of the basic lens power,
    wherein the auxiliary lens is removably combined with the basic lens,
    wherein the auxiliary lens has at least one area having a power variation, and
    wherein a location of an initial point of progressivity and a terminating point of progressivity of the combined lens are different from the basic lens.

2. The combined spectacle lens according to claim 1, wherein the resultant power/powers of one or both of an initial point of progressivity and a terminating point of progressivity of the combined spectacle lens is/are different from the power of the basic lens.

3. The combined spectacle lens according to claim 2, wherein a combined lens addition power of the combined spectacle lens is different from a basic lens addition power of the basic lens.

4. The combined spectacle lens according to claim 1, wherein the basic lens includes the progressive-power surface on the refractive surface on the eyeball side, and the refractive surface thereof on the auxiliary lens side is formed into a spherical surface or a toric surface, and the refractive surface of the auxiliary lens on the basic lens side is formed into the spherical surface or the toric surface which is the same as the refractive surface of the basic lens on the auxiliary lens side.

5. The combined spectacle lens according to claim 1, wherein first alignment marks indicating a design reference position and a predetermined direction are provided at least at two points on either one of refractive surface of the basic lens, and second alignment marks indicating the design reference position and the predetermined direction are provided at least at two points on either one of refractive surfaces of the auxiliary lens.

6. The combined spectacle lens according to claim 5, wherein the first alignment marks are provided at positions indicating a fitting point and the horizontal direction.

7. The combined spectacle lens according to claim 5, wherein the second alignment marks are provided at positions aligned with the first alignment marks.

8. A method of edging the combined spectacle lens according to claim 5, the method comprising:
    positioning refractive surfaces of the basic lens to be attached to a spectacle glass frame and the auxiliary lens to be combined with the basic lens to a predetermined relative position;
    bonding the positioned basic lens and the auxiliary lens with respect to each other;
    edging the basic lens and the auxiliary lens in a state of being bonded to each other; and separating the basic lens and the auxiliary lens,
    wherein positioning includes positioning so that the second alignment marks provided on the auxiliary lens with respect to the first alignment marks provided on the basic lens.

9. The method of edging the combined spectacle lens according to claim 8,
    wherein the basic lens formed with a progressive-power surface includes a first power portion having a power for viewing an object at a predetermined distance, a second power portion having a power different from that in the first power portion, and a progressive portion in which the power is progressively changed from the first power portion to the second power portion on either one or both refractive surfaces of object side and an eyeball side, and a resultant power obtained by combining an auxiliary lens power of the auxiliary lens and a basic lens power of the basic lens is partly or entirely different from the basic lens power of the basic lens.

10. The method of edging the combined spectacle lens according to claim 9,
    wherein the basic lens includes the progressive-power surface on the refractive surface on the eyeball side, and the refractive surface thereof on the auxiliary lens side is formed into a spherical surface or a toric surface, and the refractive surface of the auxiliary lens on the basic lens side is formed into the spherical surface or the toric surface which is the same as the refractive surface of the basic lens on the object side.

11. An auxiliary lens used only for an application to be combined with a basic lens and has a power to convert a design type of the basic lens, the basic lens including a progressive-power surface having an area with no power in one or both of upper and lower side of a principal fixation line which coincides with a principal meridian of the basic lens,
    wherein the auxiliary lens is removably combined with the basic lens,
    wherein the auxiliary lens has at least one area having a power variation, and
    wherein a location of an initial point of progressivity and a terminating point of progressivity of the combined lens are different from the basic lens.

12. The auxiliary lens according to claim 11, further comprising an area having the maximum or the minimum power in a midsection of the principal fixation line or an area having a constant power on one or both of the upper and lower sides of the principal fixation line.

* * * * *